US007150399B2

(12) United States Patent
Barrus et al.

(10) Patent No.: US 7,150,399 B2
(45) Date of Patent: Dec. 19, 2006

(54) EMBEDDING BARCODE DATA IN AN AUXILIARY FIELD OF AN IMAGE FILE

(75) Inventors: John Barrus, Menlo Park, CA (US); Gregory J. Wolff, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 174 days.

(21) Appl. No.: 10/865,584

(22) Filed: Jun. 9, 2004

(65) Prior Publication Data

US 2005/0274807 A1    Dec. 15, 2005

(51) Int. Cl.
*G06K 7/10* (2006.01)
(52) U.S. Cl. .................... 235/462.01; 235/462.25; 235/487; 382/306
(58) Field of Classification Search ........... 235/462.25, 235/462.01, 454, 487; 382/306; 395/600
See application file for complete search history.

(56) References Cited

U.S. PATENT DOCUMENTS

| 5,339,412 | A | 8/1994 | Fueki et al. |
| 5,557,091 | A | 9/1996 | Krummel et al. |
| 6,192,165 | B1 | 2/2001 | Irons |
| 6,381,418 | B1 | 4/2002 | Spurr et al. |
| 2001/0032206 | A1 | 10/2001 | Seese et al. |
| 2002/0065844 | A1 | 5/2002 | Robinson et al. |
| 2002/0080386 | A1 | 6/2002 | Snowdon et al. |
| 2002/0111960 | A1 | 8/2002 | Irons et al. |
| 2003/0033319 | A1 | 2/2003 | Van Der et al. |
| 2003/0121984 | A1* | 7/2003 | Pinchen et al. ............. 235/487 |
| 2003/0147548 | A1* | 8/2003 | Ruhl et al. .................. 382/100 |
| 2003/0154178 | A1 | 8/2003 | McIntyre et al. |
| 2003/0156138 | A1 | 8/2003 | Vronay et al. |
| 2003/0156202 | A1 | 8/2003 | van Zee |
| 2004/0068470 | A1* | 4/2004 | Klyne ......................... 705/50 |

FOREIGN PATENT DOCUMENTS

| EP | 1182863 A2 | 2/2002 |
| EP | 1398711 A1 | 3/2004 |
| GB | 2238894 A | 6/1991 |
| WO | WO 03/036515 A1 | 5/2003 |

OTHER PUBLICATIONS

European Search Report, EP 05253544, Oct. 13, 2005, 4 pages.
"IPTC-NAA Information Interchange Model," IPTC, Newspaper Association of America, Version No. 4, Rev 1, Jul. 1999, pp. 1-71.
European Search Report, EP05253544, Apr. 6, 2006, 5 pages.

* cited by examiner

*Primary Examiner*—Jared J. Fureman
*Assistant Examiner*—Kristy A. Haupt
(74) *Attorney, Agent, or Firm*—Fenwick & West LLP

(57) ABSTRACT

Information decoded from a barcode or other machine-readable code within an image file is stored as character-based data in an auxiliary field, such as a comment field, of the image file. Subsequently, the information can be extracted from the auxiliary field so as to avoid the need to repeat the image analysis and decoding operation. In one aspect, the extracted data is validated to ensure that it is consistent with the machine-readable code.

84 Claims, 6 Drawing Sheets

EMBEDDING BARCODE DATA IN AN AUXILIARY FIELD OF AN IMAGE FILE

FIELD OF THE INVENTION

The present invention relates generally to reading and processing machine-readable data such as barcode data, and more particularly to a method, system, and computer program product for embedding such data in an auxiliary field of an image file.

BACKGROUND OF THE INVENTION

Barcodes and other machine-readable codes are used extensively in industrial applications for shipment tracking, document workflow, medical applications, surveys, tracking documents, and associating paper with electronic media. In many such applications, linear and/or two-dimensional barcodes are read and decoded from electronic images that are obtained by scanning hard-copy documents. Thus, reading and decoding a barcode entails locating the barcode within an image. Such a task can often require a large amount of memory and can take a significant amount of processing time. Some devices, such as portable or handheld computers, do not have the processing power or available memory to perform such operations, and are therefore unable to decode and read barcodes from images. Other devices have the capability to perform such operations, but may do so more slowly than is desired, or may unduly task their resources in doing so.

In general, in order to read a barcode, a computer system must have enough random access memory (RAM) to load a scanned image containing the barcode, and must further have special software for locating and decoding the barcode within the scanned image. Letter-sized pages scanned at a typical resolution of 600 dpi have 5100×6600 pixels (over 33 million pixels). An image of this size can consume up to 4 megabytes of memory, or more. Finding barcodes in such a large image can take a significant amount of time and processing power.

What is needed, therefore, is a method, system, and computer program product for reading barcode data and other machine-readable data from an image file without requiring large amounts of memory and processing power. What is further needed is a method, system, and computer program product that avoids the need to read such data from a raw image file, and that takes advantage of auxiliary fields available in many image file formats. What is further needed is a method, system, and computer program-product that avoids the need to read barcode data more than once.

SUMMARY OF THE INVENTION

According to the techniques of the present invention, once barcode data has been read from an image file, it is stored as a character string within an auxiliary field of the image file. An example of such an auxiliary field is a comment field of a Tagged Image File Format (TIFF) or JPEG File Interchange Format (JFIF, commonly called JPEG) file; such comment fields are generally available in many image file formats. Subsequently, the data can be read from the auxiliary field, thus avoiding the need to use considerable processing power and memory resources to extract the encoded data. The present invention thus facilitates access to barcode data by devices and applications that would otherwise lack the hardware and/or software resources to read and decode barcode data.

Once a barcode has been initially read and decoded, several facts are known about the barcode, including its location, the symbology used, and the data represented by the barcode. Additional information can also be extracted, such as the rotation of the barcode, the width of the smallest line (the x-width), and the contrast or difference in brightness between the lines and spaces. Depending on the particular application, some or all of this information might be considered useful; for example, some applications might only need the barcode data, while other applications may need some of the other information listed above.

According to the techniques of the present invention, once a barcode has been read, any or all of the information is encoded as a character string, for example in Extended Markup Language (XML) format, and stored in an auxiliary field or in a separate file that is somehow associated with or linked to the image file. Then, any other application requiring access to the barcode data can read the data from the auxiliary field or separate file instead of searching the image and decoding the barcode itself.

Since parsing an XML file (or other representation of the barcode) is significantly less processor- and memory-intensive than barcode data decoding, the present invention provides an effective mechanism for improving the efficiency of extracting and reading such information from image files.

In addition, in some situations the installation of barcode reader software entails a fee or royalty. The present invention avoids repeated reading of the same barcode; once the barcode is read a first time on one device, it need not be read again on a second device, since the barcode data is available from an auxiliary field. Thus, the user of the present invention can avoid paying a royalty each time the barcode data is needed on a separate device.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In particular, while the following description sets forth the invention in terms of barcode data, one skilled in the art will recognize that the techniques of the present invention can be used with any other type of machine-readable data that can be transformed into a string of characters for storage in an auxiliary field. Accordingly, the term "barcode data" as used herein is intended to refer to any type of machine-readable data.

Figure 1:
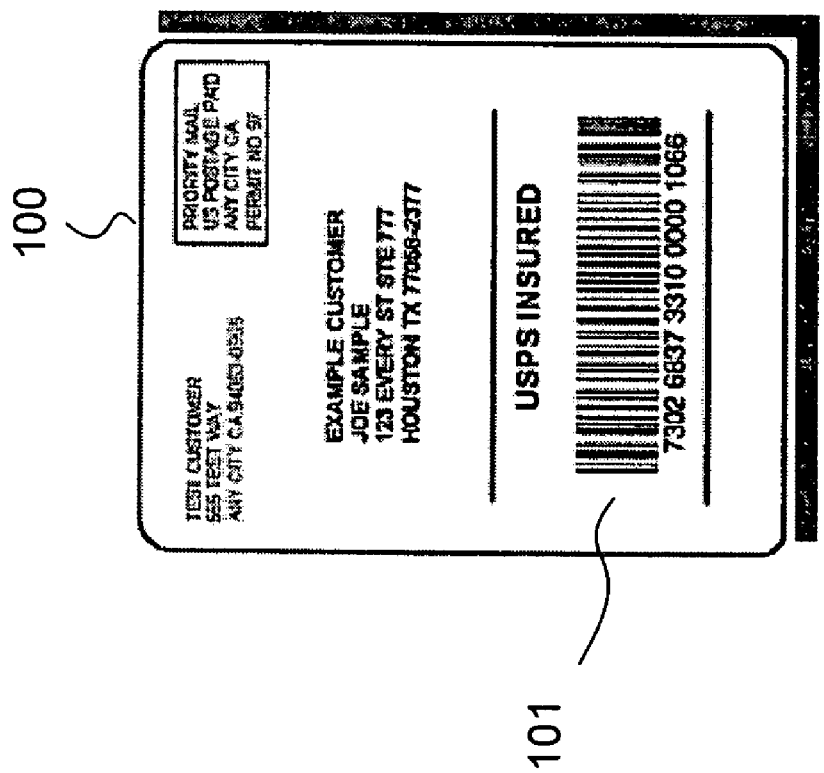
FIG. 1 is an example of a printed document including a barcode.

Referring now to FIG. 1, there is shown an example of a printed document 100 including a barcode 101. According to the techniques of the present invention, as described below, printed document 100 is scanned, an electronic image file is created, and barcode 101 is read. The data from barcode 101 is embedded in an auxiliary field of the electronic image file. One skilled in the art will recognize that the techniques of the present invention can be applied to any machine-readable code, and is not limited to barcodes or to any particular type of document, image, coding scheme, or the like. Thus, the document 100 and barcode 101 of FIG. 1 are merely examples of the type of document 100 and barcode 101 that can be processed according to the techniques described herein.

Figure 2:
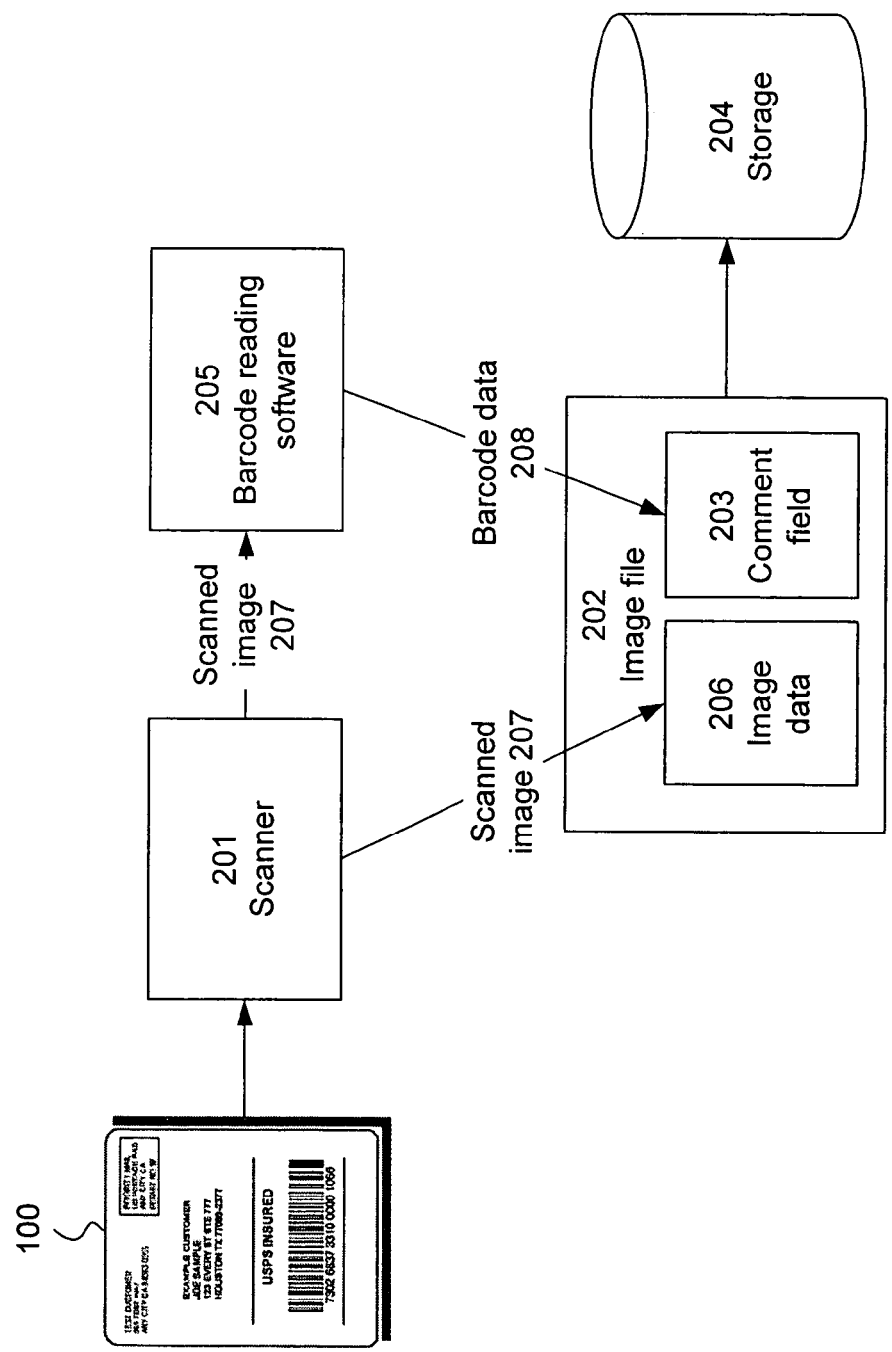
FIG. 2 is a system architecture for embedding barcode data in an auxiliary field of an image file according to one embodiment of the present invention.
Figure 4:
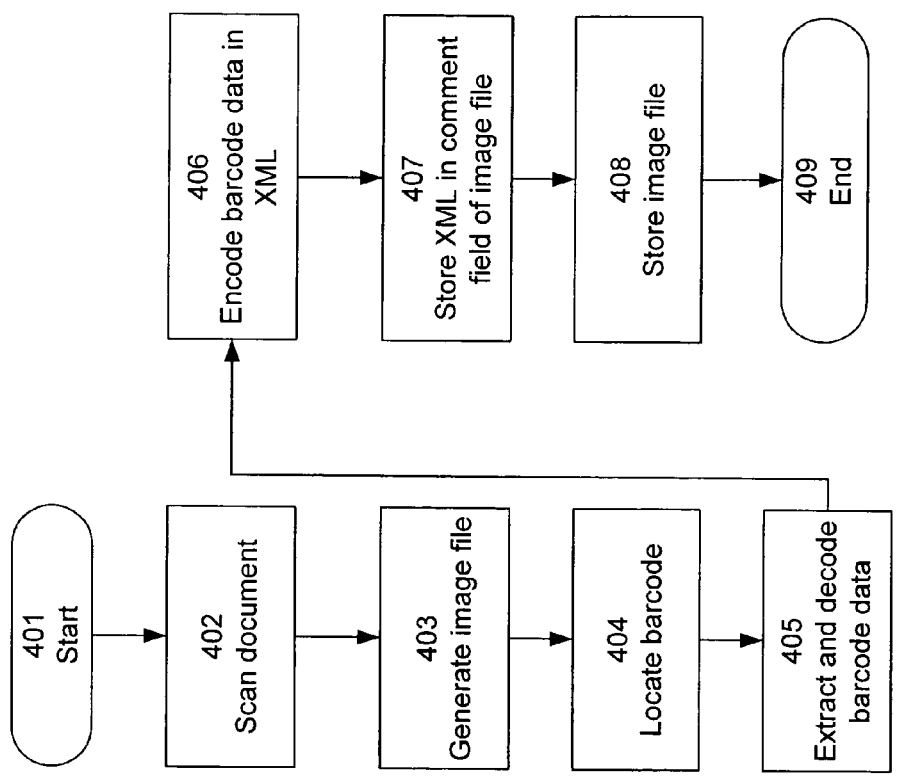
FIG. 4 is a flowchart depicting a method of embedding barcode data in an auxiliary field of an image file according to one embodiment of the present invention.

Referring now to FIG. 2, there is shown an example of a system architecture for embedding barcode data in an auxiliary field of an image file according to one embodiment of the present invention. Referring also to FIG. 4, there is shown a flowchart depicting a method of embedding barcode data in an auxiliary field of an image file according to one embodiment of the present invention. One skilled in the art will recognize that the particular system components shown in FIG. 2, and the particular method steps and sequence shown in FIG. 4, are merely exemplary and that many other variations are possible without departing from the essential characteristics of the invention.

Scanner 201, which may be a conventional commercially available scanner, scans 402 printed document 100 and generates an electronic representation of document 100, referred to as a scanned image 207. In one embodiment, scanner 201 is implemented as part of a multi-function peripheral (MFP) for performing various operations on paper documents. Such an MFP is available, for example, from Ricoh Company, Ltd of Tokyo, Japan.

Image file 202 is generated 403 from scanned image 207 according to well-known techniques. In one embodiment, image file 202 is created using Java Advanced Imaging software and APIs available from Sun Microsystems, Inc. of Santa Clara, Calif. In one embodiment, image file 202 is a compressed representation of scanned image 207, such as a JFIF (PEG) image or a TIFF image, generated according to well-known compression methods.

In another embodiment, the techniques of the present invention are applied to an image file 202 that has already been generated from a scanned image, or has been otherwise created. For example, image file 202 may be generated using a word processing or document creation program (such as Adobe Acrobat), rather than being scanned.

Barcode reading software 205 locates 404, extracts, and decodes 405 barcode 101 according to well-known barcode reading techniques. In one embodiment, this step is performed using Tasman barcode reading software available from Tasman Software of Leeds, United Kingdom, for locating and decoding barcodes in images. In one embodiment where a compressed image is used, barcode 101 is extracted before image file 202 is compressed; in another embodiment, image data 206 is compressed but other portions of image file 202 are not compressed; in another embodiment, image file 202 (or just image data 206) is decompressed before barcode 101 is extracted.

Once barcode data 208 has been extracted and decoded by software 205, it is encoded 406 (for example in XML format) and stored 407 in a comment field 203 of image file 202. Most image file formats include some form of comment field or other auxiliary field that is used to store information about the image. For example, the JFIF GPEG), Exchangeable Image File Format (EXIF), and TIFF all support storage of text comments within the image file. These text comment fields are generally used, for example, to store captions or descriptive information to accompany the digital image. According to one embodiment of the present invention, barcode data 208 is stored in comment field 203 in the XML data format, although one skilled in the art will recognize that any format can be used.

In one embodiment, where TIFF is used, barcode data 208 is stored in an "ImageDescription" field corresponding to Image File Directory (IFD) tag #270, as is known in the TIFF standard. One skilled in the art will recognize, however, that other available fields can be used for storing barcode data 208 according to the techniques of the present invention.

One advantage of storing the info in some field of image file 202 is that an application that does not know anything about barcode data 208 can copy image file 202, and barcode data 208 will be copied with it automatically. Regular file operations will not destroy barcode data 208 or the association between barcode data 208 and image data 206.

Image file 202 is stored 408 in data storage 204, which in one embodiment is a conventional hard drive storage device or other storage medium.

There are many ways to associate extracted barcode data 208 with image data 206. In one embodiment, as described above, barcode data 208 and image data 206 are stored together in a single file 202. In an alternative embodiment, decoded barcode data 208 is stored in a separate file (not shown) that is associated with or referenced by image file 202. For example, decoded barcode data 208 can be stored as a separate file in the same directory as an image file 202 containing image data 206; the two files can have the same name with different extensions, so as to indicate their relationship to one another. In another example, decoded barcode data 208 and image data 206 are stored together as separate files within an archive file. Any of these approaches can be used without departing from the essential characteristics of the present invention.

Once image file 202 has been stored in storage 204, it can be retrieved, and barcode data 208 can be read from image file 202 without requiring the use of a scanner or of barcode reading software. An application that needs barcode data 208 looks in comment field 203 of image file 202 before attempting to scan barcode 101 according to conventional means. If the barcode data is found in the comment field 203, the application will have saved processing time and memory by avoiding the need to perform a barcode scanning operation. In addition, devices (such as PDAs) that do not have the capability to locate and decode barcode data 208 can, using the techniques of the present invention, access and use barcode data 208 without having to search the image. In embodiments where image data 206 is compressed, barcode data 208 can be retrieved from image file 202 without being required to decompress image data 206.

Another advantage of the present invention in such an embodiment is that it avoids the possibility of data loss resulting from compression. If lossy compression is used, barcode 101 can be blurred or otherwise made difficult or impossible to read; by extracting barcode data 208 and storing it in comment field 203, the present invention provides a mechanism by which barcode data 208 remains readable and usable even where the original barcode 101 has been rendered unusable because of compression of image data 206.

In one embodiment, barcode 101 can be read from scanned image 207 while document 100 is still being scanned; thus, in such an embodiment barcode reading software 205 need not wait for the entire document 100 to be scanned before extracting and processing barcode data 208.

Figure 3:
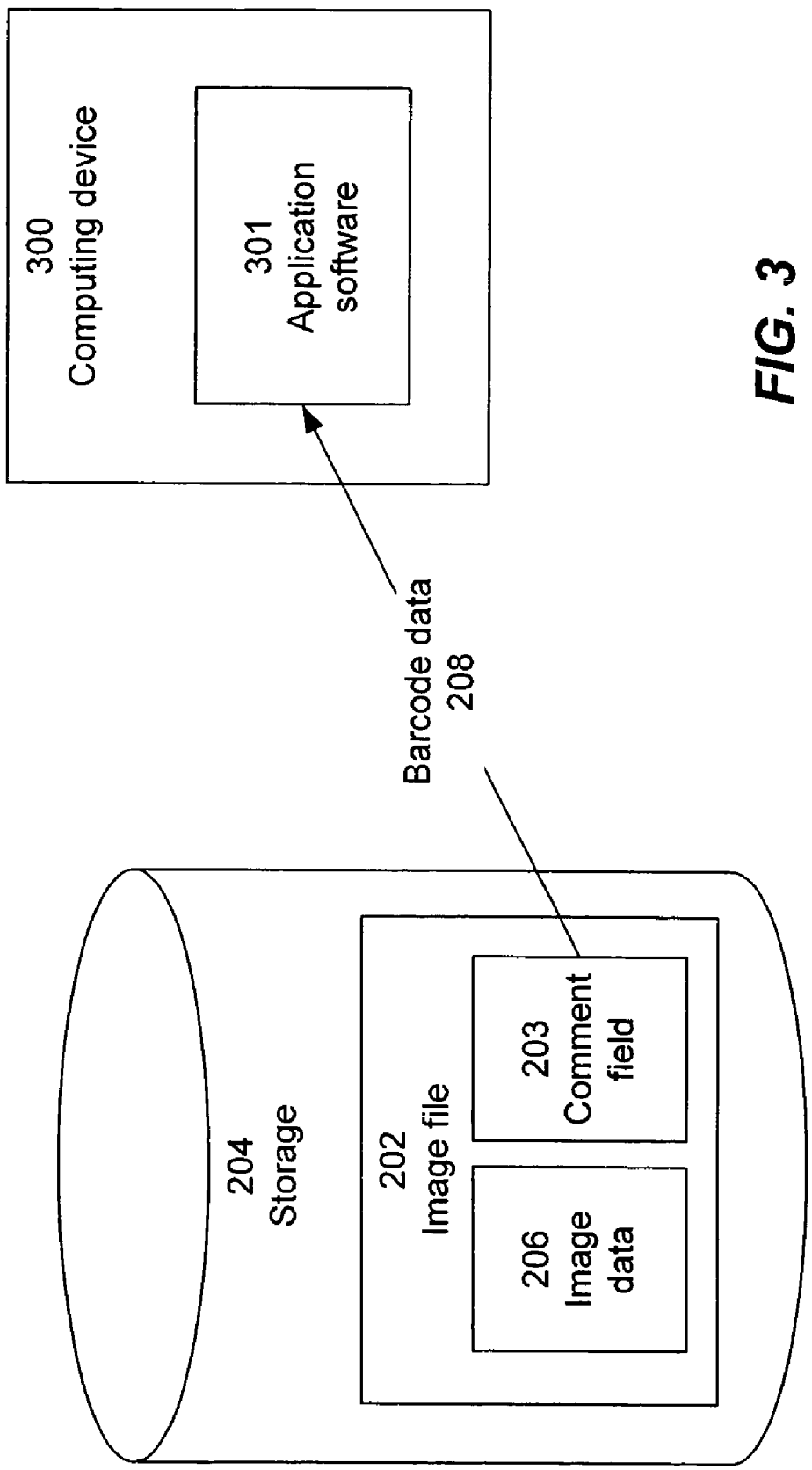
FIG. 3 is a system architecture for extracting barcode data from an auxiliary field of an image file according to one embodiment of the present invention.
Figure 5:
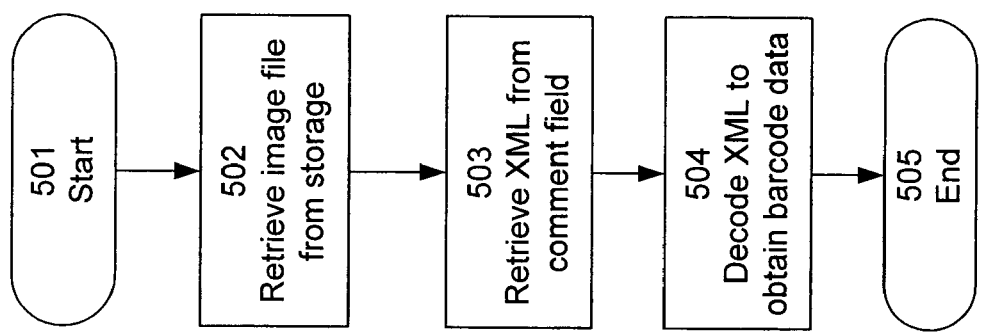
FIG. 5 is a flowchart depicting a method of extracting barcode data from an auxiliary field of an image file according to one embodiment of the present invention.

Referring now to FIG. 3, there is shown an example of a system architecture for extracting barcode data 208 from an auxiliary field, such as comment field 203, of image file 202 according to one embodiment of the present invention. Referring now to FIG. 5, there is shown a flowchart depicting a method of extracting barcode data from an auxiliary field of an image file according to one embodiment of the present invention. One skilled in the art will recognize that the particular system components shown in FIG. 3, and the particular method steps and sequence shown in FIG. 5, are merely exemplary and that many other variations are possible without departing from the essential characteristics of the invention.

A computing device 300, such as a conventional personal computer, peripheral, personal digital assistant (PDA), or the like, runs application software 301 that makes use of barcode data. For example, application software 301 may be software for interfacing with a database to determine the current location of a package that is being shipped. Computing device 300 retrieves 502 image file 202 from storage 204 according to conventional file retrieval methods. The previously extracted barcode data 208 is read from comment field 203 and provided to application software 301. In one embodiment, this is accomplished by retrieving 503 XML-encoded data from comment field 203 and decoding 504 the XML data to obtain barcode data 208. Application software 301 uses and/or processes barcode data 208 in the same manner as though data 208 had been scanned from document 100. Thus, according to the techniques of the present invention, computing device 300 is able to make use of barcode data 208 without necessarily having to expend the processing time and memory required to read barcode 101 from document 100.

Barcode data 208 can be stored in comment field 203 (or in another auxiliary field) according to any known data format. It is advantageous for data 208 to be stored in a standardized format that does not require large amounts of processing power or memory to read. In one embodiment, barcode data 208 is stored in the XML format. XML parsing libraries are available for virtually every major programming and scripting language, often at little or no cost.

In one embodiment, the following XML format for barcode data 208 is used:

| Attribute Name | Definition |
| --- | --- |
| type | Linear or 2D |
| symbology | Barcode symbology used (one of Code39, Code128, PDF417, DataMatrix, UPC, or the like) |
| x | x location of upper-left corner of bounding rectangle |
| y | y location of upper-left corner of |

-continued

| Attribute Name | Definition |
| --- | --- |
| | bounding rectangle |
| width | width of rotated bounding rectangle |
| height | height of rotated bounding rectangle (see angle) |
| spe1 | (x, y) location of starting point of leading edge of barcode |
| tpe1 | (x, y) location of terminating point of leading edge of barcode |
| spe2 | (x, y) location of starting point of trailing edge of barcode |
| tpe2 | (x, y) location of terminating point of trailing edge of barcode |
| angle | Rotation angle of bounding rectangle in radians |
| data | Data encoded in the barcode |
| xwidth | Minimum width of the lines in the barcode |
| errorfactor | Optional confidence value (1–10). |
| md5sum | MD5 sum of the data in the image file. As described in more detail below, other hash function techniques can be used |

The following is an example of barcode data 208 stored in XML format:

```
<?xml version="1.0" encoding="UTF-8"?>
<embeddedcodes>
<barcode type="linear"
symbology="Code128"
x="3508" y="117"
width="754" height="170"
angle="-0.078"
spe1="3508, 117"
tpe1="3492, 308"
spe2="4250, 175"
tpe2="4233, 325"
data="0123456789"
xwidth="17"
md5sum="fd58035de2c6ab58f8a8c0741343f01b" />
</embeddedcodes>
```

As shown in the example, in addition to storing the raw barcode data, such a format provides the ability to also store information describing the position, orientation, and other visual characteristics of the original barcode 101 as it appears in printed document 100. In some embodiments and applications, such information can be useful in extracting meaning from barcode data 208. In other embodiments, however, only the raw data is stored in comment field 203.

In one embodiment, data verification is performed to confirm that barcode data 208 stored in comment field 203 matches barcode 101. This data verification step may be useful, for example, when there is reason to suspect that barcode data 208 stored in comment field 203 may have been tampered with, corrupted, or otherwise altered. This step may also be useful when there is a possibility that the position or characteristics of barcode 101 are changed, but that comment field 203 may not have been correspondingly updated. Such a situation may take place, for example, if an image processing program is used to crop or otherwise alter image file 202 without being aware that corresponding changes need to be made to barcode data 208 in comment field 203. In either of these cases, there is a possibility that barcode data 208 in comment field 203 does not accurately reflect barcode 101. Data verification can be useful to detect such a situation, so that document 100 can be rescanned and comment field 203 updated accordingly.

In one embodiment, data verification is performed by applying a security scheme, such as one using public/private key pairs as is known in the art, so that unauthorized tampering with barcode data 208 stored in comment field 203 can be detected.

In another embodiment, a one-way hash function (such as md5 sum, SHA1 secure hash, or the like) is applied to image data 206 and/or comment field 203, so that changes to either or both can be detected. The result of the one-way hash function is included in the data stored in comment field 203. Application software 301, or another component of computing device 300, performs a hash function on image data 206 and compares the result with the hash function result stored in comment field 203. If the results match, there is a high degree of confidence that image data 206 has not been tampered with. If the results do not match, either image data 206 or comment field 203, or both, have been tampered with or otherwise altered. Appropriate action can then be taken, including for example ignoring barcode data 208 in comment field 203, rescanning image file 202, issuing an alert, flagging data 208 as invalid, prompting the user for further instructions, or the like.

In one embodiment, the hash function is applied to image data 206 after image data 206 has been compressed. Thus, application software 301 can perform its hash verification without having to decompress image data 206.

Figure 6:
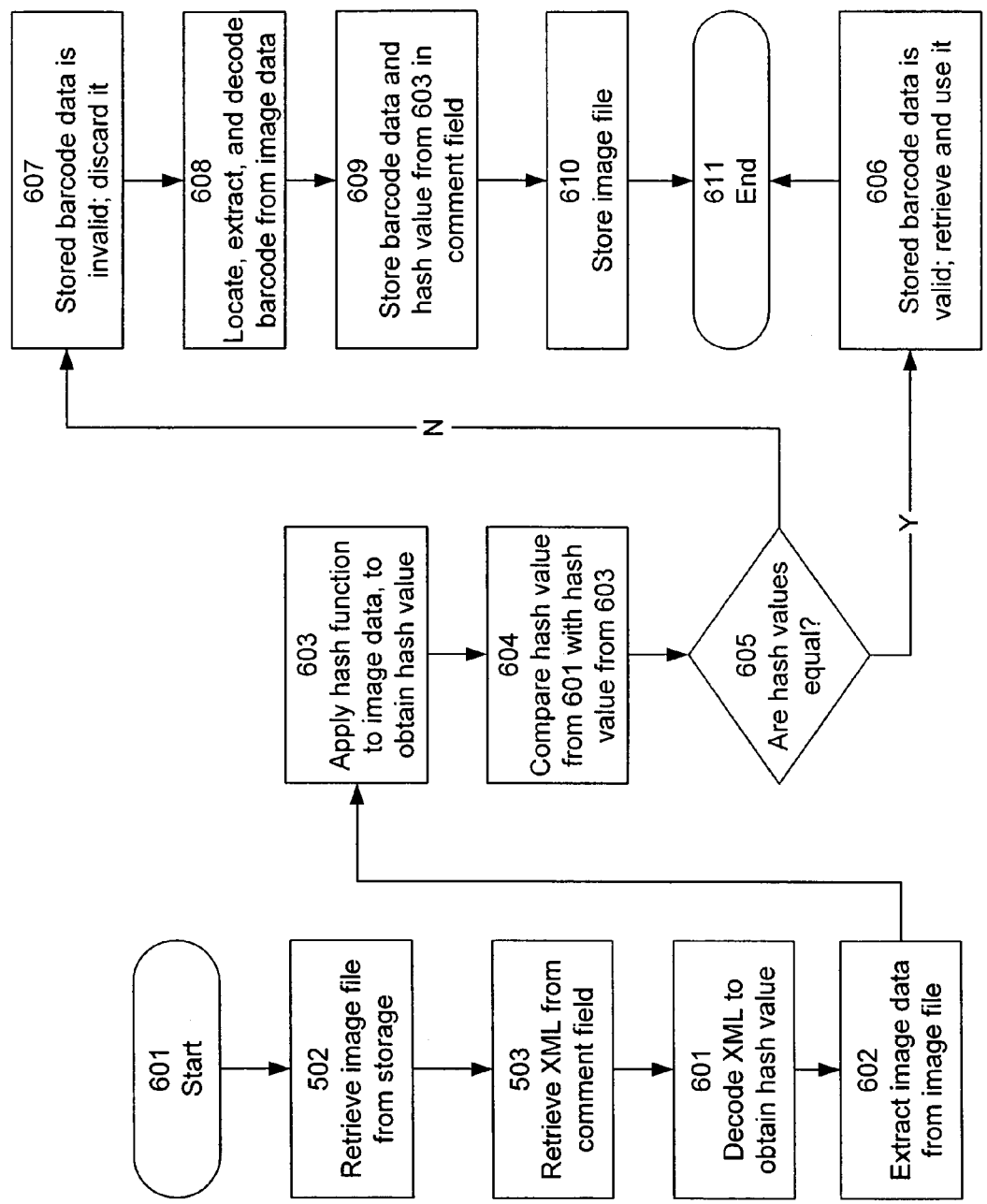
FIG. 6 is a flowchart depicting a method of authenticating data in an auxiliary field using a hash function, according to one embodiment of the present invention.

Referring now to FIG. 6, there is shown a flowchart depicting a method of authenticating data in comment field 203 (or other auxiliary field) using a hash function, according to one embodiment of the present invention. As described above in connection with FIG. 5, computing device 300, such as a conventional personal computer, peripheral, personal digital assistant (PDA), or the like, runs application software 301 that makes use of barcode data. Computing device 300 retrieves 502 image file 202 from storage 204 according to conventional file retrieval methods, and retrieves 503 XML-encoded data from comment field 203. Computing device 300 decodes 601 the XML data to obtain a stored hash value. Computing device 300 also extracts image data 206, or some portion of image data 206, from image file 202. In one embodiment, where image data 206 is encoded as TIFF, computing device 300 extracts one or more strips of image data 206. In one embodiment, image data 206 is in compressed form when extracted; the steps of FIG. 6 can be performed without decompressing data 206, if desired.

Computing device 300 applies 603 a hash function to image data 206 (or portion thereof), to obtain a hash value. The hash value obtained in 601 is compared 604 with the hash value obtained in 603. If the hash values are equal to one another, the stored barcode data 208 in comment field 203 is valid; computing device retrieves 606 and uses the stored data according to the techniques described above in connection with FIG. 5.

If the hash values are not equal to one another, the stored barcode data 208 in comment field 203 is invalid and is discarded 607. Computing device 300 locates, extracts, and decodes 608 barcode data 208 from image data 206 according to techniques described above in connection with FIG. 4, and stores 609 the barcode data 208 in comment field 203. If necessary, computing device 300 decompresses image data 206 in order to perform this step. If computing device 300 is unable to perform this step, it can transmit the image data 206 to another device to perform the step.

Computing device 300 stores 610 image file 202 including barcode data 208 embedded in comment field 203.

In one embodiment, step 609 includes encoding the barcode data in XML format as described above in connection with FIG. 4.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or, it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for storing data obtained from a machine-readable code, comprising:
    obtaining image data comprising a machine-readable code;
    retrieving the machine-readable code;
    decoding the machine-readable code to obtain data; and
    storing the obtained data, in a non-image format, in a field in an image file comprising the image data.

2. The method of claim 1, wherein obtaining image data comprises obtaining an image file comprising image data.

3. The method of claim 1, wherein the image data comprises data from a scanned document.

4. The method of claim 1, wherein obtaining image data comprises scanning a document.

5. The method of claim 1, wherein the machine-readable code comprises a barcode.

6. The method of claim 1, wherein storing the obtained data in a field in the image file comprises storing the data in a comment field in the image file.

7. The method of claim 1, wherein storing the obtained data in a field of the image file comprises embedding the data in the image file.

8. The method of claim 1, wherein storing the obtained data in a field of the image file comprises storing the data in a text field in the image file.

9. The method of claim 1, wherein storing the obtained data comprises storing the data as a character string.

10. The method of claim 1, wherein storing the obtained data comprises storing the data in XML format.

11. The method of claim 1, further comprising storing at least one of:
    the position of the machine-readable code in the image data;
    the orientation of the machine-readable code in the image;
    a visual characteristic of the machine-readable code.

12. The method of claim 1, further comprising applying a hash function to the obtained data and storing the result of the hash function.

13. The method of claim 1, further comprising applying a hash function to the image data and storing the result of the hash function.

14. The method of claim 1, further comprising encrypting the obtained data, and wherein storing the obtained data comprises storing the encrypted data.

15. A method for retrieving stored data representing a machine-readable code in an image, comprising:
    obtaining an image file comprising image data, the image data comprising a machine-readable code; and
    retrieving, from a first field in the image file, a representation of the machine-readable code in non-image format.

16. The method of claim 15, wherein the image file comprises a scanned document.

17. The method of claim 15, wherein the machine-readable code comprises a barcode.

18. The method of claim 15, wherein the image file comprises a data field, and wherein retrieving the representation of the machine-readable code comprises retrieving the representation from the data field.

19. The method of claim 15, wherein the image file comprises a comment field, and wherein retrieving the representation of the machine-readable code comprises retrieving the representation from the comment field.

20. The method of claim 15, wherein the image file comprises a text field, and wherein retrieving the representation of the machine-readable code comprises retrieving the representation from the text field.

21. The method of claim 15, wherein the representation of the machine-readable code comprises a character string.

22. The method of claim 15, wherein the representation of the machine-readable code comprises data in XML format.

23. The method of claim 15, further comprising retrieving, from a second field of the image file, at least one of:
    the position of the machine-readable code in the image represented by the image file;
    the orientation of the machine-readable code in the image; and
    a visual characteristic of the machine-readable code.

24. The method of claim 15, further comprising:
    retrieving, from the image file, a first hash function value;
    applying a hash function to at least a portion of the image data to obtain a second hash function value; and
    comparing the first hash function value with the second hash function value to determine validity of the representation of the machine-readable code.

25. The method of claim 24, further comprising, responsive to the representation not being valid:
    retrieving the machine-readable code from the image data;
    decoding the machine-readable code to obtain data; and
    storing the obtained data, in a non-image format, in a second field in the image file.

26. The method of claim 24, wherein the image data is compressed, and wherein applying the hash function comprises applying the hash function to at least a portion of the compressed image data.

27. The method of claim 24, wherein the image data is compressed, and wherein applying the hash function comprises decompressing the image data and applying the hash function to at least a portion of the decompressed image data.

28. The method of claim 15, wherein the image data is compressed, and wherein retrieving the representation of the machine-readable code comprises retrieving the representation without decompressing the image data.

29. A computer program product for storing data obtained from a machine-readable code, comprising:
a computer-readable medium; and
computer program code, encoded on the medium, for:
obtaining image data comprising a machine-readable code;
retrieving the machine-readable code;
decoding the machine-readable code to obtain data; and
storing the obtained data, in a non-image format, in a field in the image file comprising the image data.

30. The computer program product of claim 29, wherein the computer program code for obtaining image data comprises computer program code for obtaining an image file comprising image data.

31. The computer program product of claim 29, wherein the image data comprises data from a scanned document.

32. The computer program product of claim 29, wherein the computer program code for obtaining image data comprises computer program code for scanning a document.

33. The computer program product of claim 29, wherein the machine-readable code comprises a barcode.

34. The computer program product of claim 29, wherein the computer program code for storing the obtained data in a field of the image file comprises computer program code for storing the data in a comment field in the image file.

35. The computer program product of claim 29, wherein the computer program code for storing the obtained data in a field of the image file comprises computer program code for embedding the data in the image file.

36. The computer program product of claim 29, wherein the computer program code for storing the obtained data in a field of the image file comprises computer program code for storing the data in a text field in the image file.

37. The computer program product of claim 29, wherein the computer program code for storing the obtained data comprises computer program code for storing the data as a character string.

38. The computer program product of claim 29, wherein the computer program code for storing the obtained data comprises computer program code for storing the data in XML format.

39. The computer program product of claim 29, further comprising computer program code for storing at least one of:
the position of the machine-readable code in the image data;
the orientation of the machine-readable code in the image;
a visual characteristic of the machine-readable code.

40. The computer program product of claim 29, further comprising computer program code for applying a hash function to the obtained data and storing the result of the hash function.

41. The computer program product of claim 29, further comprising computer program code for applying a hash function to the image data and storing the result of the hash function.

42. The computer program product of claim 29, further comprising computer program code for encrypting the obtained data, and wherein the computer program code for storing the obtained data comprises computer program code for storing the encrypted data.

43. A computer program product for retrieving stored data representing a machine-readable code in an image, comprising:
a computer-readable medium; and
computer program code, encoded on the medium, for:
obtaining an image file comprising image data, the image data comprising a machine-readable code; and
retrieving, from a first field in the image file, a representation of the machine-readable code in non-image format.

44. The computer program product of claim 43, wherein the image file comprises a scanned document.

45. The computer program product of claim 43, wherein the machine-readable code comprises a barcode.

46. The computer program product of claim 43, wherein the image file comprises a data field, and wherein the computer program code for retrieving the representation of the machine-readable code comprises computer program code for retrieving the representation from the data field.

47. The computer program product of claim 43, wherein the image file comprises a comment field, and wherein the computer program code for retrieving the representation of the machine-readable code comprises computer program code for retrieving the representation from the comment field.

48. The computer program product of claim 43, wherein the image file comprises a text field, and wherein the computer program code for retrieving the representation of the machine-readable code comprises computer program code for retrieving the representation from the text field.

49. The computer program product of claim 43, wherein the representation of the machine-readable code comprises a character string.

50. The computer program product of claim 43, wherein the representation of the machine-readable code comprises data in XML format.

51. The computer program product of claim 43, further comprising computer program code for retrieving, from a second field of the image file, at least one of:
the position of the machine-readable code in the image represented by the image file;
the orientation of the machine-readable code in the image; and
a visual characteristic of the machine-readable code.

52. The computer program product of claim 43, further comprising computer program code for:
retrieving, from the image file, a first hash function value;
applying a hash function to at least a portion of the image data to obtain a second hash function value; and
comparing the first hash function value with the second hash function value to determine validity of the representation of the machine-readable code.

53. The computer program product of claim 52, further comprising computer program code for, responsive to the representation not being valid:
retrieving the machine-readable code from the image data;
decoding the machine-readable code to obtain data; and
storing the obtained data, in a non-image format, a second field of the image file.

54. The computer program product of claim 52, wherein the image data is compressed, and wherein the computer program code for applying the hash function comprises computer program code for applying the hash function to at least a portion of the compressed image data.

55. The computer program product of claim 52, wherein the image data is compressed, and wherein the computer program code for applying the hash function comprises computer program code for decompressing the image data and applying the hash function to at least a portion of the decompressed image data.

56. The computer program product of claim 43, wherein the image data is compressed, and wherein the computer program code for retrieving the representation of the machine-readable code comprises computer program code for retrieving the representation without decompressing the image data.

57. A system for storing data obtained from a machine-readable code, comprising:
- an image input device, for obtaining image data comprising a machine-readable code;
- an image processor, coupled to the input device, for retrieving the machine-readable code from the image data;
- a decoder, coupled to the image processor, for decoding the machine-readable code to obtain data; and
- a storage device, coupled to the decoder, for storing the obtained data, in a non-image format, in a field in the image file comprising the image data.

58. The system of claim 57, wherein the image input device obtains an image file comprising image data.

59. The system of claim 57, wherein the image data comprises data from a scanned document.

60. The system of claim 57, wherein image input device comprises a document scanner.

61. The system of claim 57, wherein the machine-readable code comprises a barcode.

62. The system of claim 57, wherein the storage device stores the data in a comment field in the image file.

63. The system of claim 57, wherein the storage device embeds the data in an image file.

64. The system of claim 57, wherein the storage device stores the data in a text field in the image file.

65. The system of claim 57, wherein the storage device stores the data as a character string.

66. The system of claim 57, wherein the storage device stores the data in XML format.

67. The system of claim 57, wherein the storage device further stores at least one of:
- the position of the machine-readable code in the image data;
- the orientation of the machine-readable code in the image;
- a visual characteristic of the machine-readable code.

68. The system of claim 57, further comprising a hash function application module, coupled to the image input device, for applying a hash function to the obtained data, and wherein the storage device stores the result of the hash function.

69. The system of claim 57, further comprising a hash function application module, coupled to the image input device, for applying a hash function to the image data, and wherein the storage device stores the result of the hash function.

70. The system of claim 57, further comprising an encryption module, coupled to the image input device, for encrypting the obtained data, and wherein the storage device stores the encrypted data.

71. A system for retrieving stored data representing a machine-readable code in an image, comprising:
- an image file receiver, for obtaining an image file comprising image data, the image data comprising a machine-readable code; and
- a reader, coupled to the image file receiver, for retrieving, from a first field of the image file, a representation of the machine-readable code in non-image format.

72. The system of claim 71, wherein the image file comprises a scanned document.

73. The system of claim 71, wherein the machine-readable code comprises a barcode.

74. The system of claim 71, wherein the image file comprises a data field, and wherein the reader retrieves the representation of the machine-readable code from the data field.

75. The system of claim 71, wherein the image file comprises a comment field, and wherein the reader retrieves the representation of the machine-readable code from the comment field.

76. The system of claim 71, wherein the image file comprises a text field, and wherein the reader retrieves the representation of the machine-readable code from the text field.

77. The system of claim 71, wherein the representation of the machine-readable code comprises a character string.

78. The system of claim 71, wherein the representation of the machine-readable code comprises data in XML format.

79. The system of claim 71, wherein the reader further retrieves, from a second field of the image file, at least one of:
- the position of the machine-readable code in the image represented by the image file;
- the orientation of the machine-readable code in the image; and
- a visual characteristic of the machine-readable code.

80. The system of claim 71, wherein the reader further retrieves, from the image file, a first hash function value, the system further comprising:
- a hash function application module, coupled to the reader, for applying a hash function to at least a portion of the image data to obtain a second hash function value; and
- a comparison module, coupled to the function application module, for comparing the first hash function value with the second hash function value to determine validity of the representation of the machine-readable code.

81. The system of claim 80, further comprising:
- a code reader, for, responsive to the representation not being valid, retrieving the machine-readable code from the image data;
- a decoder, coupled to the code reader, for decoding the machine-readable code to obtain data; and
- a storage device, coupled to the decoder, for storing the obtained data, in a non-image format.

82. The system of claim 80, wherein the image data is compressed, and wherein the hash function application module applies the hash function to at least a portion of the compressed image data.

83. The system of claim 80, wherein the image data is compressed, the system further comprising a decompression module for decompressing the image data;
and wherein the hash function application module applies the hash function to at least a portion of the decompressed image data.

84. The system of claim 71, wherein the image data is compressed, and wherein the reader retrieves the representation of the machine-readable code without decompressing the image data.

* * * * *